United States Patent [19]
Schneider

[11] Patent Number: 6,134,841
[45] Date of Patent: Oct. 24, 2000

[54] DOOR SYSTEM FOR UTILITY VEHICLES

[75] Inventor: Boris Sebastian Heinrich Schneider, Laudenbach, Germany

[73] Assignee: Schneider Fahrkomfort GmbH, Mannheim, Germany

[21] Appl. No.: 09/415,789

[22] Filed: Oct. 8, 1999

[30] Foreign Application Priority Data

Oct. 10, 1998 [DE] Germany .......................... 298 18 161

[51] Int. Cl.$^7$ ....................................................... B60J 5/04
[52] U.S. Cl. ....................................... 49/502; 296/190.11
[58] Field of Search ............................. 49/501, 381, 504, 49/502; 296/190.01, 190.11, 202, 146.11, 146.5

[56] References Cited

U.S. PATENT DOCUMENTS

| | | | |
|---|---|---|---|
| 3,828,476 | 8/1974 | Tenenbaum et al. | 49/501 |
| 4,652,043 | 3/1987 | Hurlburt | 296/190.11 |
| 5,125,716 | 6/1992 | Smith et al. | 296/190.11 |

*Primary Examiner*—Jerry Redman
*Attorney, Agent, or Firm*—Collard & Roe, P.C.

[57] ABSTRACT

A door system for utility vehicles having a frame forming the cab or canopy protecting the driver. The door system comprises a door pivotally mounted on hinges to the frame forming the cap or canopy. The door has a door frame having a T-shaped cross section. A receiving section is mounted on the transverse leg of the T-shaped cross-section. A door lining with windowpanes and/or cover plates is inserted on the other side of the receiving section.

4 Claims, 2 Drawing Sheets

DOOR SYSTEM FOR UTILITY VEHICLES

BACKGROUND OF THE INVENTION

1. Field of the Invention

The invention relates to a door system for utility vehicles such as fork-lift trucks, tractors, construction machines, agricultural machines and municipal (or public utility) vehicles. In particular, the system consists of a frame forming the cab or canopy protecting the driver, and a door within the frame that pivots on hinges.

2. The Prior Art

Typically with such utility vehicles, a door is inserted on the side of the cab or canopy allowing the driver to get into and out of the driver's cabin. The door is usually a steel door and has a steel plate containing flat iron elements and angles as well as ducts for the lock and hinge system. The significant drawback of this known design is that it is expensive to manufacture.

SUMMARY OF THE INVENTION

It is therefore an object of the invention to provide a door system that is assembled from simple structural components and which can be easily installed.

This and other objects are accomplished by a door system in which the door has a door frame having a T-shaped cross-section. A receiving section is mounted on the transverse leg of the T-shaped cross section. A door lining with windowpanes and/or cover plates is inserted in the receiving section.

In a preferred embodiment of the invention, hinge fasteners are mounted on the transverse leg of the T-section for connection with hinges on the frame of the cab or canopy protecting the driver. Metallic transverse struts are also preferably mounted on the doorframe.

There is also preferably an edge protection and sealing section on the inner side of the transverse leg of the T-section against the frame of the cab or canopy protecting the driver.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
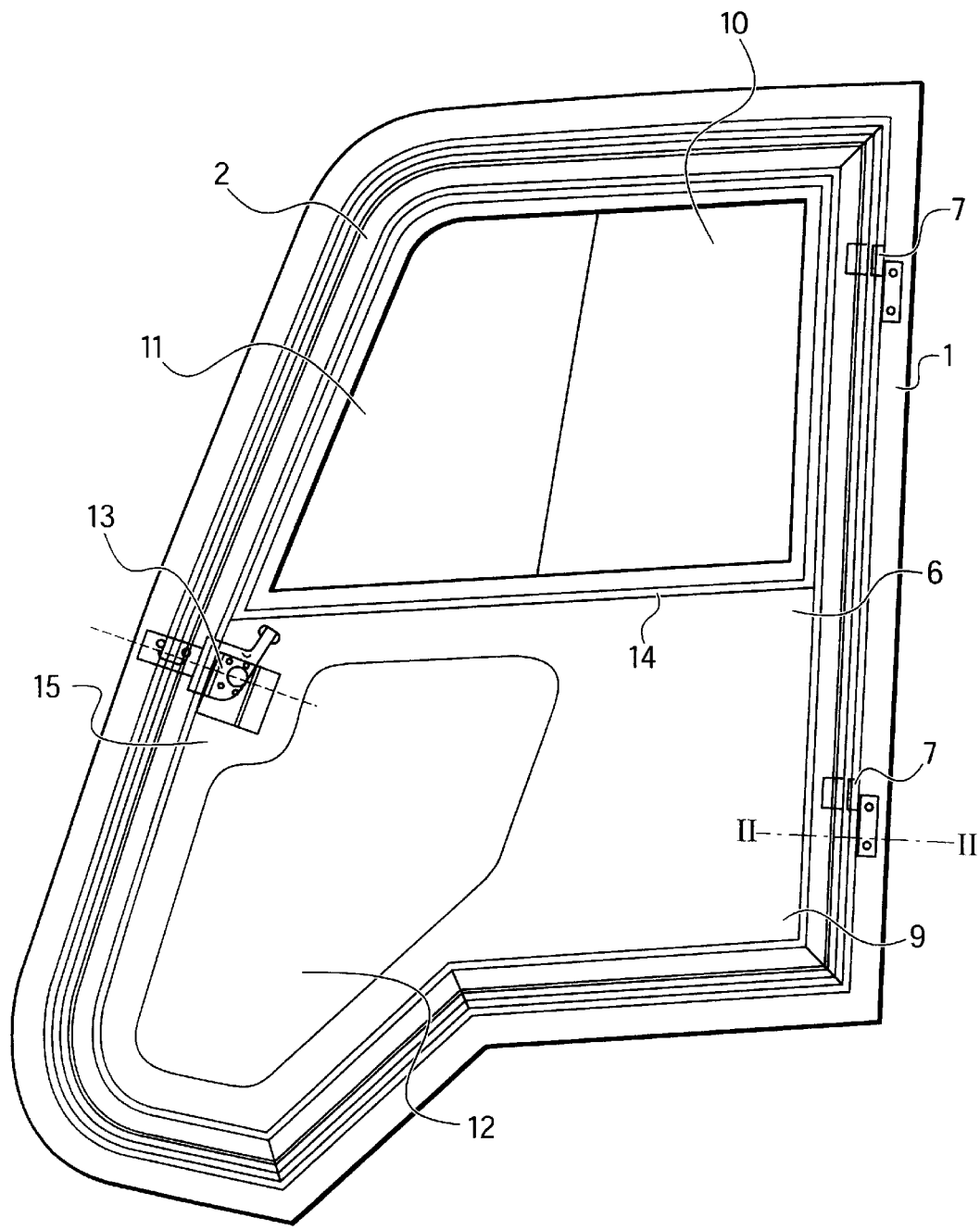
FIG. 1 is a view of the door system with the frame of the cab or canopy protecting the driver.
Figure 2:
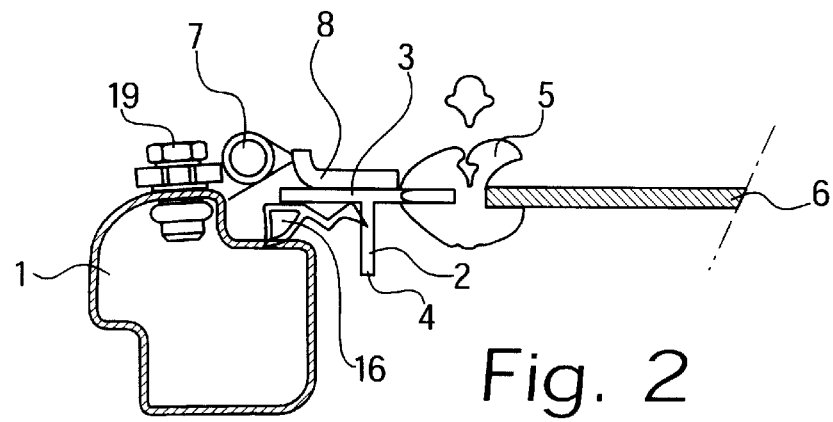
FIG. 2 is a cross section according to line II—II in FIG. 1.
Figure 3:
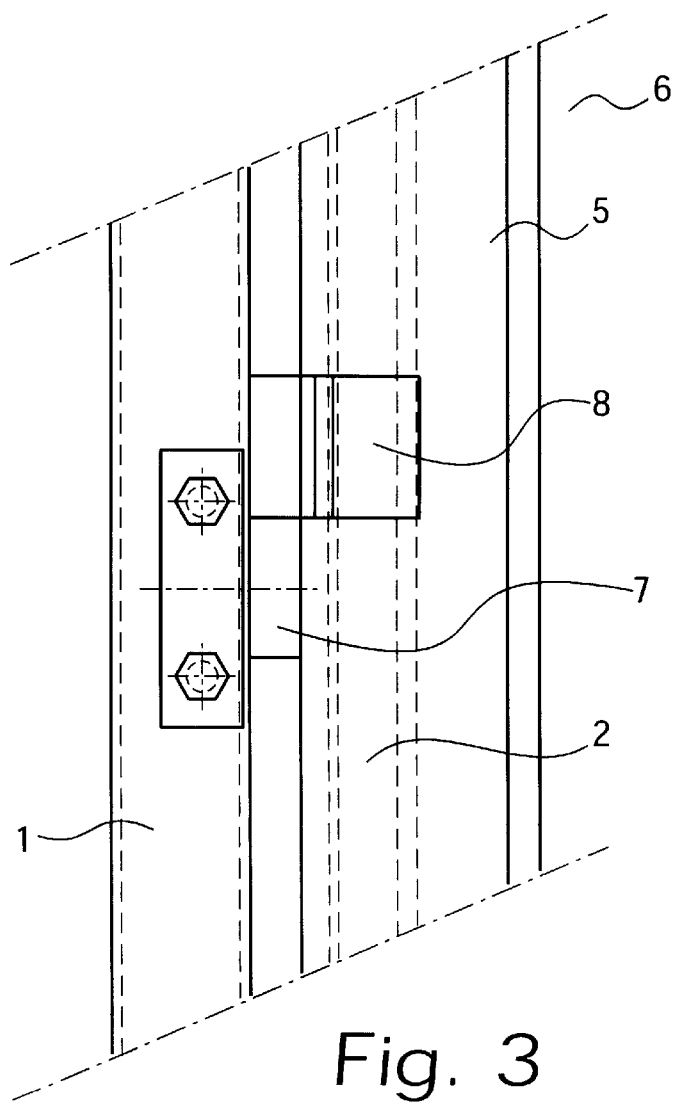
FIG. 3 is a plan view of FIG. 2.

Referring now in detail to the drawings and, in particular, FIG. 1, there is shown a door 15 arranged on the left side of a cab or canopy protecting the driver of a fork-lift truck. Door 15 closes the side opening of frame 1 of the cab or canopy protecting the driver. Door 15 has a door frame 2 having a T-shaped cross section (shown in FIG. 3), in which the outer transverse leg 3 is disposed in the plane of the door. The inwardly pointing part of transverse leg 3 has a receiving section 5 made of rubber or plastic, and a lining 6 is inserted on the other side of receiving section 5. The other leg 4 of the T-shaped cross section points inwardly, and an edge protecting and sealing section 16 is inserted between the outwardly directed part of transverse leg 3 and leg 4. Sealing section 16 seals the door 15 against the inside and rests against frame 1 of the cab or canopy protecting the driver.

As shown in FIG. 1, lining 6 of door 15 has a fixed windowpane 10, a sliding window 11, leg space windowpane 12, and a plastic board 9. A transverse strut 14 can be installed as an additional stabilizing means.

Door 15 is pivoted on frame 1 via hinges 7. Hinges 7 are mounted on a hinge fastening 8 which is welded on the outside of transverse leg 3 of the T-shaped cross-section of door frame 2. The hinges 7 are joined with frame 1 by screws 19. On the opposite side, the door can be locked on frame 1 via a lock 13.

The system according to the present invention is especially useful in that the flat, steel sheet with openings as employed in the prior art is replaced by a frame having a T-shaped or Z-shaped cross section extending all around. Such frames offer the advantage that they can be reshaped by bending and/or rounding in a simple and therefore cost-saving manner.

Accordingly, while only a single embodiment of the present invention has been shown and described, it is obvious that many changes and modifications may be made thereunto without departing from the spirit and scope of the invention.

What is claimed is:

1. A door system for utility vehicles, with a frame forming a canopy protecting a driver, comprising:

a door pivotally mounted on one side of the canopy via hinges, and comprising a door frame edging extending all around the door and having a T-shaped cross section with a transverse lea having inner and outer sections disposed in the plane of the door and a cross lea extending perpendicular to said transverse leg;

a receiving section mounted on the inner section of the transverse leg of the T-shaped cross section; and a door lining having windowpanes and cover plates inserted on said receiving section.

2. The door system according to claim 1, further comprising hinge fasteners mounted on the outer section of the transverse leg of the T-section for connection with the hinges on the frame of the canopy protecting the driver.

3. The door system according to claim 1, further comprising metallic transverse struts mounted on the door frame.

4. The door system according to claim 1, further comprising an edge protection and sealing section mounted between the inner section of the transverse leg and the cross leg of the T-shaped cross section and resting against the frame of the canopy protecting the driver.

* * * * *